Aug. 18, 1931. G. P. LUNT 1,819,563
METHOD OF MANUFACTURING ACETIC ANHYDRIDE
Filed June 4, 1929 2 Sheets-Sheet 2
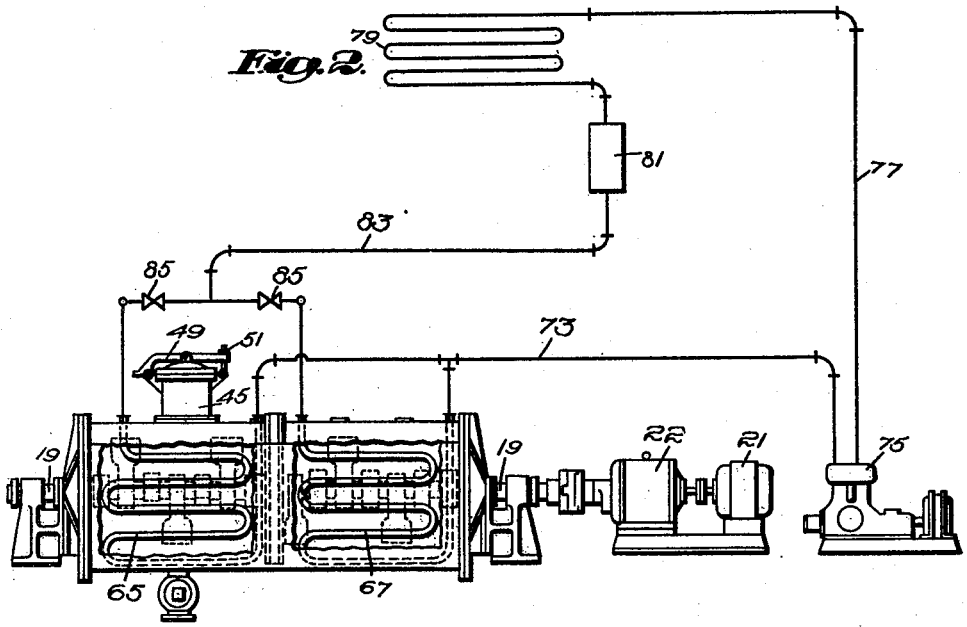
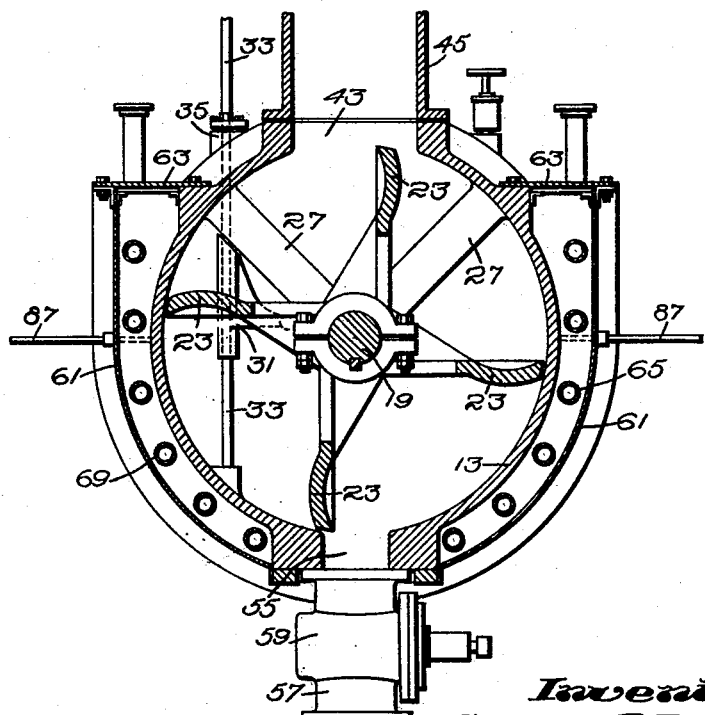
Inventor:
George P. Lunt
by Emery, Booth, Varney & Townsend
Attys Patented Aug. 18, 1931

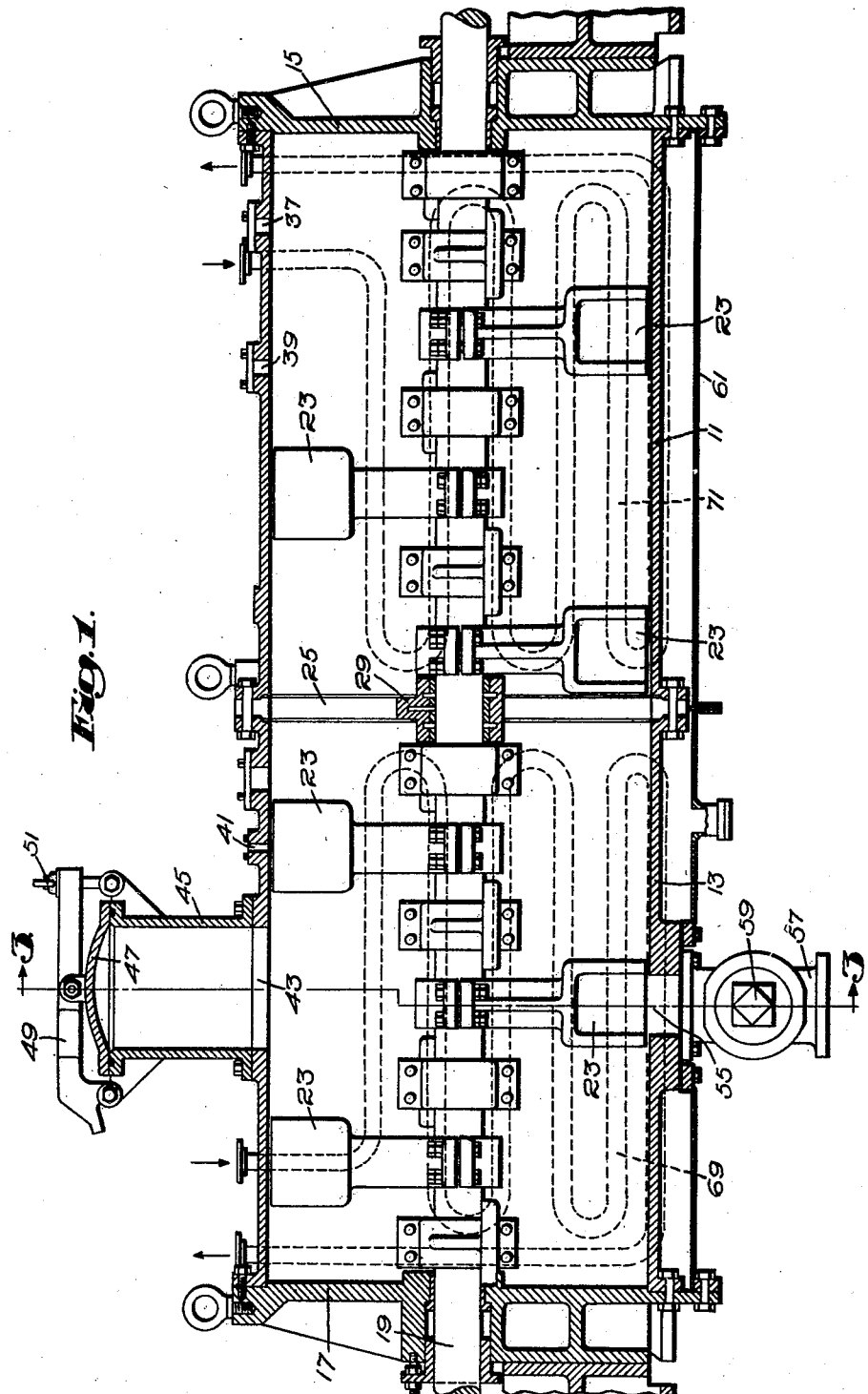

1,819,563

UNITED STATES PATENT OFFICE

GEORGE P. LUNT, OF BROOKLINE, MASSACHUSETTS, ASSIGNOR TO E. B. BADGER & SONS COMPANY, OF BOSTON, MASSACHUSETTS, A CORPORATION OF MASSACHUSETTS

METHOD OF MANUFACTURING ACETIC ANHYDRIDE

Application filed June 4, 1929. Serial No. 368,316.

This invention relates to methods of manufacturing acetic anhydride, and has for its object facilitating such manufacture by rendering the process more certain, effective and speedy.

In the process of manufacturing acetic anhydride, an anhydrous alkali acetate, such as anhydrous acetate of soda, together with other chemicals necessary to provide the required reaction, such, for example, as liquid sulphur chloride or sulphuryl chloride and chlorine gas, are ordinarily introduced into a container or reaction chamber and subjected to agitation. After the reaction is complete, the resulting products are withdrawn and the acetic anhydride separated by distillation.

During the reaction the temperature of the mixture should be maintained within a range approximating that between minus 5 degrees centigrade and plus 10 degrees centigrade, and for the most effective results just below plus ten degrees centigrade. If the latter temperature is exceeded, other reactions occur and the object of the process is perverted by the production of undesirable products.

In carrying out the process on a commercial scale, this temperature limitation requires that the liquid and gaseous ingredients be fed to the mixer slowly and deliberately since the reaction is rather violent and the heat generated is considerable, and the latter must be rapidly dissipated before it is augmented by the feeding of additional material or ingredients. The process of charging the mixer may, for example, cover a period of from ten to twelve hours in duration.

Furthermore, whatever means of heat dissipation is employed, if the rate thereof is substantially constant it is difficult and practically impossible to avoid wide fluctuations and sharp rises of temperature in the mixer contents, often carrying such temperature above the range specified, since the augmented reaction which follows a momentary increase in the rate of feed of charging quickly raises the temperature and carries it out of any control which is available either through stopping the feed or reducing the rate of the feed. If the temperature starts to rise through any such cause, it quickly gets out of hand and mounts rapidly to the detriment of the intended process.

The present invention contemplates the absorption of the heat of reaction by a chilling agent comprising brine or other liquid having a low freezing point, which is maintained in contact with the walls of the mixer, this being coupled with control means whereby the temperature and heat absorbing capacity of the liquid may be maintained with reference to the variable rate of charging and may be quickly raised or lowered to counteract changes in the temperature of the mixer contents, preventing any rise above the prescribed temperature limit and maintaining the temperature of the mixer at the most effective point and within the prescribed temperature range. This not only permits the charging operation to be performed more rapidly than heretofore, but assures that the reaction will be carried out at the most efficient temperature and in spite of inevitable momentary variations in the rate of charging.

In the described embodiment of the invention, quick-acting temperature control means having a wide range of control are provided by immersing in the body of the brine refrigerating or expansion coils connected to a closed endless system of refrigeration including the usual elements of such a system, such as a compressor, a condenser and an expansion valve or valves, whereby a volatile refrigerant, such, for example, as ammonia, may be volatilized at the mixer in the presence of the liquid brine at a rate which may be controlled during the charging of the mixer with reference to temperature variations in the mixer contents.

The invention will be best understood by reference to the following description when taken in connection with the accompanying drawings showing one specific embodiment thereof, while its scope will be more particularly pointed out in the appended claims.

In the drawings:

Fig. 1 is a central, longitudinal section taken through the mixer and the chilling jacket;

Fig. 2 is a side elevation of the mixer, partly broken away, showing the expansion coils and showing in partly diagrammatic form the application of a refrigerating system thereto; and Fig. 3 is a cross sectional elevation taken on the line 3—3 in Fig. 1.

Referring to the drawings and to the specific embodiment of the invention therein shown for illustrative purposes, the reaction chamber is provided by a mixer consisting of a generally cylindrical chamber formed in two or more sections 11 and 13 and having the opposite ends closed by heads or end closures 15 and 17. Mounted in journal bearings provided by the end closures is a central, longitudinal driving shaft 19 adapted to be driven by a motor 21 (Fig. 2) through a gear reducer 22, and carrying a series of paddles or mixing vanes 23. The mixing vanes are mounted on arms secured to the driving shaft and successive vanes are set in progressive staggered relation 90 degrees apart. The working ends of the mixing vanes are somewhat concave or scoop shaped in the direction of rotation and work in close relationship to the walls of the mixer, so that the material contained in the mixer is worked toward and over the walls thereof to secure the most efficient extraction of heat therefrom.

The two sections 11 and 13 of the mixing chamber are connected together by an interposed annular ring 25 which carries the two hanger arms 27 (Fig. 3), the latter providing support for an intermediate journal bearing 29 for the driving shaft.

Attached to the journal bearing 29 is a bracket 31 (Fig. 3) which serves as a guide and support for a thermometer 33 positioned between the two adjoining paddles and between the two adjoining sections, the thermometer protruding upwardly through an opening in a lug 35 formed on the ring 25 so that its readings are externally observable and an indication of the temperature of the contents of the mixer may be had at all times. Similarly externally readable thermometers may be located at other points lengthwise the mixer if desired.

The top of the mixing chamber is provided with openings through which the various ingredients may be entered from time to time, these including the smaller openings 37, 39 and 41, and additionally a relatively larger opening 43 in the section 13, the latter for entering the solid anhydrous acetate of soda. The opening 43 is surmounted by the upright barrel or sleeve 45 having a cover 47 joined to the hinged arm 49, by which it may be opened or closed, and secured in place by the fastening 51. This opening not only provides a charging opening for the anhydrous acetate of soda but also access to the mixer for purposes of cleaning.

The bottom of the mixer is provided with a drainage opening 55 connected to the outlet pipe 57 controlled by a valve 59 through which the material may be withdrawn after the reaction has been completed.

Referring now to the application of the heat absorbing agent, the side walls and bottoms of both sections of the mixer or reaction chamber are surrounded by a steel or other sheet metal jacket 61 spaced from the walls so as to provide an intermediate jacket space which is filled with some liquid having a low freezing point, such, for example, as brine. The top of the jacket space is covered by the cap pieces 63 so that the jacket space is entirely closed and may be completely filled with the liquid brine, which contacts freely with the exterior walls of the mixer over substantially the entire area, except the top thereof, and is most effectively applied for absorbing the heat of reaction from the materials as they are thrown by the mixer vanes toward and over the inner surface of the mixer walls. Immersed in the liquid brine, there are provided a series of expansion coils, four sets of such coils 65, 67, 69 and 71 being herein utilized, one for each opposite side of each section of the mixer.

These coils constitute the expansion coils of a closed endless refrigerating system utilized for the purpose of controlling the temperature of the brine, in which system there may be used any suitable volatile refrigerant, such as ammonia gas, one end of each of said coils being connected to a common return main 73 (Fig. 2) leading to the suction or inlet end of the motor driven compressor 75. The discharge end of the compressor is connected to the main 77 delivering the compressed refrigerant to the condenser, which is conventionally represented at 79, where it is liquified and passed to the receiver 81. The receiver is connected by the main 83 to the opposite end of each set of coils through separate and individual expansion valves 85, which are adapted to be controlled either automatically or by an operative or attendant at the mixer during the charging and mixing operation, so that the rate at which the refrigerant is admitted to each set of expansion coils immersed in the brine solution and therein utilized can be quickly and immediately varied to meet any rapid surge or change in the heat of reaction, as may be indicated by the thermometer 33. Provision is preferably made for indicating thermometers 87 (Fig. 3) for indicating the temperature of the brine itself within the jacket.

In carrying out this process with the described form of mixer, the jacket space having been filled with liquid brine, the motor 21 is connected into circuit to start the operation of the mixing vanes, and the refrigerating compressor is also put in operation to bring the brine solution to the desired initial temperature.

In the practical performance of the process, there is ordinarily first introduced into the mixer a relatively small amount of acetic anhydride to act as a "slurry" charge to assist in completing the reaction. This, for example, may be introduced through the charging opening 37. The slurry charge of acetic anhydride having been introduced, the entire charge of anyhydrous acetate of soda required for the complete reaction is then introduced through the charging opening 43, filling a large part of the mixing chamber. A quantity of liquid sulphur chloride or sulphuryl chloride is then entered through the opening 39. The reaction immediately starts and chlorine gas is then added through the opening 41 which continues the reaction. As soon as the reaction is under way the expansion valves 85 are manipulated to control the admission of the compressed ammonia to the expansion coils, which will cause an immediate response in the temperature of the brine solution, the latter being brought to a sufficiently low temperature to bring the temperature of the mixer contents, as indicated by the thermometer 33, to a point slightly under 10 degrees centigrade. As the indicated temperature drops, additional quantities of the liquid and gaseous ingredients are added through the respective charging openings. If this addition tends momentarily to raise the temperature of the mixer above the 10 degrees centigrade, the attendant immediately counteracts such rise by manipulation of the expansion valves 85. This process of alternate charging the mixer with added quantities of the liquid and the gas and counter temperature readjustment continues to be carried out, this intermittent process usually extending over a period of several hours, the final completion of the reaction being indicated when the addition of further liquid and gas fails to effect a rise in temperature. Since the heat of reaction, however, is quickly controllable at all times by the manipulation of the expansion valves to vary the rate of volatilization of the ammonia in the surrounding brine bath and to increase or diminish the heat absorbing capacity of the brine, which effect is communicated almost instantly to the mixer contents, the charging operation may be carried on more rapidly than heretofore and without the hesitation and uncertainty heretofore experienced, but with certainty at all times of maintaining the heat of reaction within the limits required, preventing the chemical change from getting out of hand and from forming other products.

While I have herein shown and described for the purpose of illustration one specific form of apparatus for carrying out the invention and one specific method for carrying into effect the described process, it is to be understood that extension deviations may be made from the details herein set forth, all without departing from the spirit thereof.

Claims:

1. The process of manufacturing acetic anhydride which consists in charging a batch mixer with anhydrous acetate of soda, feeding by stages from time to time variable, individual quantities of sulphur chloride or sulphuryl chloride and chlorine gas to produce the required reaction, agitating the materials fed to the mixer, absorbing the heat of reaction from the walls of the mixer by a contacting body of liquid having a low freezing point, chilling the liquid by volatilizing a volatile refrigerant at the mixer in the presence of said liquid, and quickly changing the rate of volatilization from time to time with reference to the rate of feed of materials to the mixer to counteract the rise in the heat of reaction following the feeding of such materials and to maintain the temperature of the materials in the mixer within a prescribed temperature range.

2. The process of manufacturing acetic anhydride which consists in charging a reaction chamber with anhydrous acetate of soda, feeding by stages from time to time variable, additional quantities of sulphur chloride or sulphuryl chloride and chlorine gas to produce the desired reaction, agitating the materials fed to the mixer, absorbing the heat of reaction from the walls of the mixer by a contacting body of liquid having a low freezing point, and controlling the temperature of the liquid with reference to the rate of feed of the materials to quickly check a rise in temperature due to the heat of reaction by expanding or volatilizing a refrigerant in said liquid.

3. The process of manufacturing acetic anhydride which consists in charging a reaction chamber with anhydrous acetate of soda, feeding by stages from time to time variable, additional quantities of sulphur chloride or sulphuryl chloride and chlorine gas to produce the desired reaction, agitating the materials fed to the mixer, absorbing the heat of reaction from the walls of the mixer by a contacting body of liquid having a low freezing point, and quickly changing the temperature of the liquid with reference to the rate of feed of the materials to the chamber to maintain the temperature in the chamber within the required temperature range and check rises in temperature due to momentary increases in the rate of feed.

In testimony whereof, I have signed my name to this specification.

GEORGE P. LUNT.